COMBINATIONS OF STATISTICAL MACHINES

Filed Oct. 14, 1957

3 Sheets-Sheet 1

INVENTOR
IVOR VIVAN RIGBY

BY

ATTORNEYS

Aug. 9, 1960 I. V. RIGBY 2,948,468

COMBINATIONS OF STATISTICAL MACHINES

Filed Oct. 14, 1957 3 Sheets-Sheet 2

INVENTOR
IVOR VIVAN RIGBY
BY Kane and Dalsimer
ATTORNEYS

INVENTOR
IVOR VIVAN RIGBY
BY Haseltine and Nydick
ATTORNEYS

United States Patent Office 2,948,468

Patented Aug. 9, 1960

2,948,468

COMBINATIONS OF STATISTICAL MACHINES

Ivor Vivian Rigby, Letchworth, England, assignor to International Computers and Tabulators Limited, London, England, a British company Filed Oct. 14, 1957, Ser. No. 689,984

Claims priority, application Great Britain Oct. 15, 1956

13 Claims. (Cl. 235—61.7)

The present invention relates to statistical apparatus comprising a master machine, for example a tabulator, and a slave machine, for example, a punching machine.

It is known to employ a combination of a tabulator and a punch to prepare summary cards. Record cards are fed through the tabulator, which accumulates the amounts recorded in predetermined fields of the cards. A group control mechanism on the tabulator detects when there is a change of indicative data between successive cards, indicating that all the detail cards of a group have been sensed, suspends card feeding and initiates totalling operations. The values registered by the counters may then be printed and also recorded on a summary card by the punch.

A summary card may be incorrectly punched. This is checked by totalling the amounts punched in the summary cards and comparing this with control totals previously calculated from the detail cards. If there is disagreement between the summary and control totals, it is necessary to determine which summary card is incorrect. It will be appreciated that this may require a considerable time if the check has to be made manually on a large number of summary cards, all relating to one set of control totals.

It is an object of the present invention to provide means for comparing data registered in a master machine with data registered by a slave machine, and means for controlling the subsequent operation of the master and/or slave machine in accordance with the result of the comparison.

It is a further object of the invention to provide means for accumulating totals in the master machine, means for comparing the totals with those sensed from a card by the slave machine, and means for causing the slave machine to record the totals registered by the master machine if the comparison indicates disagreement.

According to one aspect of the invention statistical apparatus comprises a master machine with at least one accumulator settable to represent different values, a slave machine adapted to sense a series of data bearing record cards in succession, means adapted to be operated by a signal from the master machine to compare a sensed data item with the value registered by the accumulator, and means adapted to be operated by the comparing means to control the subsequent operation of the master and/or slave machine.

According to another aspect of the invention the master machine may include a first means for sensing data bearing records in succession, at least one accumulator being settable in response to the sensing of said cards, the comparing means being operable under control of the first sensing means.

According to a further aspect of the invention means may be provided adapted to be operated in response to a given indication by the comparing means to record the value registered by the accumulator.

The invention will now be described in detail with reference to the accompanying drawing. A known type of tabulator, for example, that described in British patent specification Nos. 422,135 and 422,179 may be used in conjunction with a known reproducing punch, for example that described in patent specification No. 442,534, for carrying out the comparison checking operation.

The drawings show only those circuits which take part in the application of the invention to the apparatus, and details of the operation of those parts of the machines which are not affected are not shown.

Figure 3:
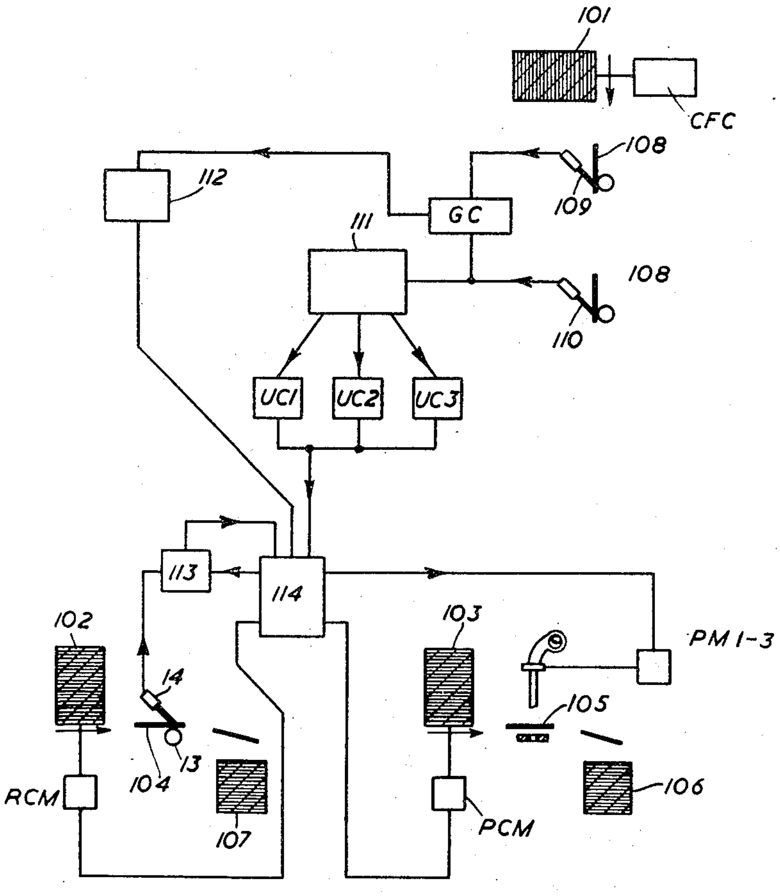
Figure 3 is a schematic diagram showing the principal parts of the apparatus.

For the purposes of checking the summary cards if an error has been noted in the final totals at the end of a tabulating and summary card punching operation, the original groups of cards are placed in the feeding mechanism of the tabulator, referenced 101 in the schematic drawing shown in Figure 3. The summary cards are placed in the auxiliary feeding mechanism 102 of the reproducer. Blank cards are placed in the punch feeding mechanism 103 of the reproducer. The machines are started and, at the end of each group of cards, the tabulator performs its usual totalling operations and initiates a comparing operation by starting the auxiliary feed of the reproducer. The summary card 104, relating to the group of cards dealt with by the tabulator, is fed through the sensing station of the reproducer and the data punched therein is compared with the values standing in the accumulators of the tabulator. If these values are in agreement the tabulator is automatically restarted. After the accumulators are reset, the tabulator commences to feed and process cards of the next group.

If an error is detected during the comparing operation the tabulator does not restart. Instead, a starting impulse is applied to the punching feed of the reproducer. The totals now standing in the tabulator counters are punched into a new summary card 105, and the punching feeding mechanism of the reproducer advances the newly punched card into a card stacker 106. The machine operator removes the original summary card now on the stacker 107, and the new summary card from the reproducer, and visually compares them. If the difference between the totals in the two summary cards equals the difference between the first and second final totals it may be assumed that the error has been corrected, and the new summary card takes the place of the original summary card. If the difference between the summary cards is not the same as that between the final totals, a further error is indicated, and the checking operation is restarted by closure of a key on the tabulator.

During operation of the tabulator, cards 108 are fed past two sensing stations 109 and 110, and data is transferred to accumulators such as 111, while the cards are passing the lower station 110.

Feeding of cards is controlled by a card feed clutch CFC (Figures 1 and 3), which is initially energised by the operation of a start key ST. A circuit is established from supply line 1, contacts MC*c* of a master control relay, start key contacts ST, clutch magnet CFC, relay R2 to a second supply line 2. Contacts CFC*a* and CFC*b* are closed by the operation of the feed clutch and provide a hold circuit for the clutch magnet through cam operated contacts L2 to line 1.

In the absence of a card at the upper sensing station contacts UCLR*a* are broken, and the card feed clutch CFC is de-energised when the contacts L2 break towards the end of each card cycle. The contacts L2 remake before the beginning of a new card cycle. When a card is present at the upper sensing station the contacts UCLR$a$ are operated, and an alternative holding circuit for the feed clutch magnet is provided from the contacts CFC$a$, through the contacts UCLR$a$, contacts MC$c$, to line 1. The de-energisation of the feed clutch magnet under these conditions is brought about by the operation of the contacts MC$c$ in the alternative holding circuit. The disengagement of the clutch takes place when the contacts L2 break.

Resumption of card feeding takes place when the contacts MC$c$ resume their original positions, provided that a card is present at the lower sensing station, in which case the contacts LCLR$a$ are made. This circuit extends from line 1, contacts MC$c$, contacts UCLR$a$, contacts LCLR$a$, cam operated contacts CR8, which are timed to make shortly before the beginning of a card cycle, an automatic start switch AS (closed), the clutch magnet CFC, relay R2, and line 2.

Figure 1:
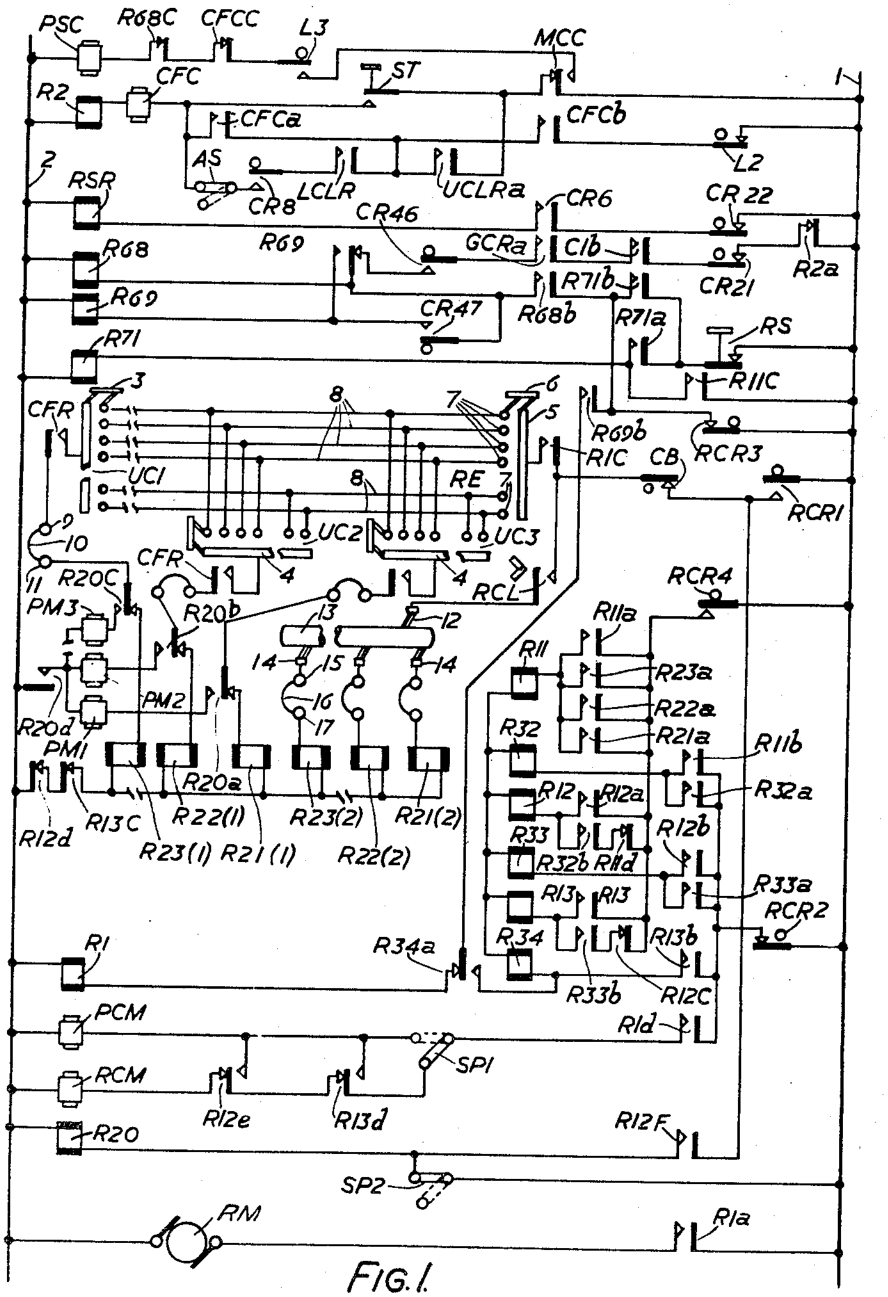
Figure 1 is a circuit diagram of the apparatus.

The operation of contacts MC$c$ is controlled by indication of a group change. When the last card of one group is sensed at the lower sensing station 110 (Figure 3) and the first card of a new group is sensed at the upper sensing station 109, a circuit is established for the operation of a group control circuit GC. A relay GCR (not shown) within this circuit is operated. This group control relay, in turn, operates a master control relay MC (not shown) which operates the contacts MC$c$ (Figure 1). The master control relay conditions a cycle control circuit, shown schematically at 112 in Figure 3, and initiates a predetermined number of machine cycles to allow the tabulator to complete calculating, totalling or printing operations. The last of these cycles is used to reset those counters required to accept new information from the next group of cards, and is known as cycle R.

The progress of these machine cycles is under the control of a "P-shaft" (not shown), whose drive is engaged by the operation of a clutch PSC (Figure 1). The master control relay controls the operation of the clutch PSC, and remains operated until the end of cycle R to prevent further card feeding until all machine cycles have been completed. The clutch magnet PSC is energised by a circuit from line 1, contacts MC$c$ now operated, contacts L3, contacts CFC$c$ made when the feed clutch CFC is disengaged, contacts R68$c$ of a relay R68, to the clutch magnet PSC and line 2. The contacts L3 are operated by a cam from a shaft revolving continuously in synchronism with the card feeding mechanism and make at the beginning of each machine cycle. The foregoing operations are described in detail in the British patent specifications Nos. 422,135 and 422,179 referred to.

The contacts R68$c$ of a relay R68 are used to disconnect the circuit to the clutch magnet PSC immediately before the reset cycle R to allow a cycle of operation of the reproducer, hereinafter termed a "reproducer cycle," to take place after the tabulator calculations have taken place but before the counters are reset. The penultimate tabulator cycle, during which such calculations are completed, is known as "cycle 1" and is controlled by a relay C1 (not shown). During the progress of the cycle 1, a circuit becomes effective for the operation of relay 68 from line 1 through contacts R2$a$ of relay 2 now de-energised, cam-operated contacts CR21, contacts C1$b$ of the relay C1, contacts GCR$a$ of the group control relay (now closed), cam-operated contacts CR46, normally made contacts R69$a$ of relay R69, to the coil of relay R68 and line 2. The opening of contacts R68$c$ de-energises the clutch magnet PSC to disengage the drive to the P-shaft at the end of machine cycle 1.

The cycle control circuit will remain ineffective during the operation of the reproducer while the relay R68 remains operated. When operation of the reproducer is completed the relay R68 is de-energised and contacts R68$c$ re-make the circuit to the clutch magnet PSC. The tabulator cycle R follows and a relay CR (not shown) is operated to cause resetting of the counters by operation of a resetting relay RSR over a circuit from line 1, cam operated contacts CR22, contacts CR6 (now closed) to the coil of relay RSR and line 2. At the end of the cycle R, the master control relay MC is released and its contacts MC$c$ restore, disconnecting the clutch magnet PSC and providing the automatic start circuit to the card feeding clutch magnet CFC. Thus, the prevention of tabulator cycling is seen to depend on the continued operation of the relay R68.

The foregoing circuit details relate to a tabulator similar to that described in British patent specifications Nos. 422,135 and 422,179. It will be realized, however, that the main elements comprise a card feeding and sensing means, a device for detecting the end of a group of cards and one or more accumulators for totalling the values recorded on the cards. The end of a card group may be determined by detecting a designation hole which is punched in the last card of a group rather than by comparing indicative data, for example. Furthermore, a single cycle only may be necessary, provided that the required summary totals may be formed in the accumulators directly.

A reproducer cycle is brought about by the operation of a relay R69 in the following manner. When the relay R68 operates, the contacts R68$b$ establish a holding circuit to a cam operated contact RCR3 (Figures 1 and 2) in the reproducer, which breaks towards the end of the reproducer cycle. The circuit extends from line 1, contacts RCR3, contacts R68$b$, to the coil R68 and to line 2. Towards the end of the tabulator machine cycle 1 a cam-operated contact CR47 makes and extends the path from contacts R68$b$ to the coil of relay R69 and line 2. Contacts R69$a$ of relay R69 now operate to short-circuit the contacts CR47 and provide a hold circuit for the relay R69. The circuit from contacts RCR3 is extended through contacts R69$b$ of relay R69, through the coil of a relay R1 to line 2 and relay R1 operates.

The reproducer is driven by a motor RM which is connected across the lines 1 and 2 by contacts R1$a$ of the relay 1. The contacts RCR3 are operated by a cam (not shown) whenever cards are fed in the punching or sensing feeds of the reproducer, so that the motor RM will continue to run until the contacts RCR3 break towards the end of a reproducer cycle.

Card feeding in the reproducer is controlled by a reproducer cycle control circuit 114 (Figure 3), and depends upon the action of two clutches. A "punch clutch," operated by a punch clutch magnet PCM, causes cards to feed through the punching station, and a "reading clutch," operated by a magnet RCM, causes feeding of cards through the sensing station. Both clutches have a single cycle action, and once operated remain engaged for a complete reproducer cycle. Operation of the reproducer is described in detail in the British patent specification No. 442,534 referred to.

During a comparing operation the reading clutch is operated by a circuit, shown in Figure 1, from line 1, cam-operated contacts RCR2, which open after clutch engagement is complete, contacts R1$d$ of relay R1 now closed, switch contacts SP1, contacts R13$d$, contacts R12$e$, coil RCM to line 2. The sensing feed mechanism then becomes operative.

The operation of checking is carried out by means of a comparing unit 113 in which an emitter RE is driven by a continuously revolving shaft of the reproducer in synchronism with the reproducer card cycle. The input to the emitter RE is taken from line 1 through cam-operated contacts RCR1, which are closed for the duration of the card cycle. The circuit then passes to contacts CB of a circuit breaker cam, which make at the sensing time of every digit indicating position during the reproducer card cycle. From these contacts the circuit passes through contacts R1$c$ of relay R1 to input common strips 5 of the emitter RE.

Contact brushes 6 in the emitter RE connect the common strip 5 to each of contact studs 7 in turn, passing each stud 7 at the moment in the card cycle when a corresponding digit-representing position of a card is presented at the sensing station. The output of the emitter RE is taken by means of lines 8 to conventional reading out commutators UC1, UC2, UC3 (Figures 1 and 3), fitted to the tabulator accumulators, in each of which a brush 3 is adjusted by an accumulator wheel in accordance with the digit registered therein. A common strip 4 of the counter commutator UC1, UC2, UC3 is connected by means of contacts CFR of counter function relays (not shown), plugboard connector 9, a plugwire 10, a plugboard connector 11 to contacts R20*a*, R20*b*, R20*c* of a selecting relay R20. It will be appreciated that there is a reading out commutator and a corresponding contact of the relay R20 for each denomination of the accumulator, and that two or more accumulators may be used.

The circuits from the emitter RE continue through contacts R20*a*, R20*b*, R20*c* (Figure 1) to first coils of comparing relays R21, R22, R23, one to each accumulator denomination, and then through contacts R13*c*, contacts R12*d* to line 2.

The relays R21, R22, R23 each have two similar coils, arranged in opposition, on a common core, so that simultaneous energisation of both coils will not cause operation of the relay. Each relay will operate when only one coil is energised.

The second coils of the relays R21, R22, R23 are connected to the sensing station of the reproducer through which the previously punched summary cards are passed by the operation of the magnet RCM. The circuit for relay 23, for example, extends from line 1, contacts RCR1, contacts CB, contacts RCL which are closed whenever cards are present at the sensing station, common brush 12, sensing roll 13, sensing brush 14, a plugboard connector 15, a plugwire 16, a plugboard connector 17, the second coil of relay R23 contacts R13*c*, contacts R12*d* to line 2. If the value of the hole punched in the card corresponds with the digit standing in the tabulator accumulator both coils of relay R23 are energised at the same time and the relay does not operate. The circuits for the operation of other comparing relays R21 and R22 are similar to that described for the relay R23.

If agreement exists between the holes punched in the card and the totals standing in the tabulator accumulators the tabulator resetting and automatic starting circuits are brought into operation when contacts RCR3 open at the end of the reproducer cycle. Opening of these contacts allows the relays R68 and R69 to release. The contact R68*c* re-makes to allow energisation of the tabulator P-shaft clutch PSC and the interrupted tabulator cycles continue.

When the cycle R is reached, control relay CR (not shown) is operated. A counter reset relay is operated by a circuit from line 1, contacts CR22, contact CR*b* of relay CR, reset relay coil RSR to line 2. The relay RSR causes resetting of the tabulator accumulators. At the end of the reset cycle the master control relay MC releases, and its contacts MC*c* restore. The tabulator feed clutch magnet CFC is then re-energised and cards of a new group are fed in the tabulator. The entire sequence of events is then repeated for this new group of cards.

If the holes punched in the summary card do not agree with the totals in the tabulator counters, one or more of the comparing relays operates during the card cycle of the reproducer. Operation of any of the comparing relays initiates the operation of a series of error indicating relays R11, R12, R13 to prevent the tabulator starting circuits becoming effective and to cause a new summary card to be produced.

A circuit from line 1 through cam-operated contacts RCR4, any of the comparing relay contacts R21*a*, R22*a*, R23*a*, relay coil R11 to line 2, operates the relay R11, whose contacts R11*a* provide a holding circuit in parallel with the comparing relay contacts. Contacts RCR4 are made during the reproducer cycle and break, after cam-operated contacts RCR2 make, towards the end of the cycle. Contacts RCR2 break in the following reproducer cycle after the contacts RCR4 are re-made.

Figure 2:
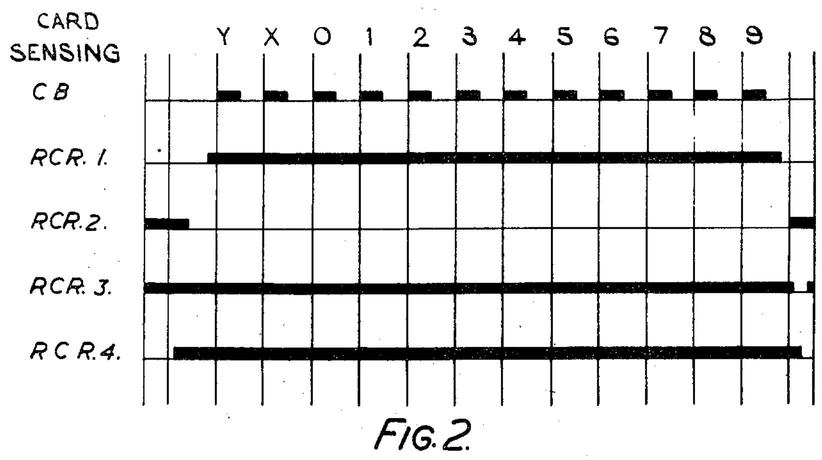
Figure 2 is a timing chart.

Operation of the relay R11 closes contacts R11*c* and provide a circuit from line 1, contacts R11*c*, relay coil R71 to line 2. The relay R71 operates and contacts R71*a* extend the circuit from the coil R71 to a holding circuit through a key contact RS to line 1. The contacts R71*b* close and short-circuit the contacts RCR3 through the contacts RS to line 1, to prevent relays R68, R69 and R1 becoming deenergised when the contacts RCR3 break at the end of the first reproducer cycle (Figure 2).

The remaining error indicating relays are operated sequentially as follows: Contacts R11*b* of relay 11 (Figure 1) close and connect line 1 through contacts RCR2, contacts R11*b* to relay coil R32 and line 2. When contacts RCR2 close, towards the end of the first reproducer cycle, relay R32 operates. Its contacts R32*a*, in parallel with contacts R11*b*, provide a hold circuit until contacts RCR2 break at the beginning of the second cycle. Relay R11 is de-energised when contacts RCR4 break towards the end of the first cycle. When contacts RCR4 re-make at the beginning of the second cycle a circuit is provided from line 1, contacts RCR4, contacts R11*d* (now closed), contacts R32*b* (closed), relay coil R12 to line 2. Relay R12 operates and its contacts R12*a* provide a hold circuit to the contact RCR4 to maintain the relay R12 through the second reproducer cycle. Contacts R12*b* of relay R12 provide a circuit to operate relay R33, similar to that for the operation of relay R32, when contacts RCR2 operate towards the end of the second reproducer cycle. Contacts R33*a* provide a hold circuit for relay R33 between the second and third reproducer cycles, while contacts RCR2 are made. When contacts RCR4 make during the third reproducer cycle, relay R13 operates over a circuit from line 1, contacts RCR4, contacts R12*c*, contacts R33*b*, relay coil R13 to line 2. Towards the end of the third reproducer cycle a circuit from line 1, contacts RCR2, contacts R13*b* of relay R13, relay coil R34 to line 2, operates relay R34. Relay 34 holds over a circuit from line 1, key contacts RS, contacts R71*b*, contacts R69*b*, contacts R34*a* (now operated), relay coil R34 to line 2. The operation of the contacts R34*a* disconnects the circuit for the relay R1.

When relay R1 is de-energised its contacts R1*d* disconnect the circuit to the clutch control magnets PCM and RCM, and its contacts R1*a* disconnect the reproducer drive motor.

During the card sensing period of the second reproducer cycle, a selecting relay R20 is operated by a circuit from line 1, contacts RCR1, contacts R12*f*, relay R20 coil to line 2. The contacts R20*a*, R20*b*, R20*c* divert the emitter RE output circuits through the tabulator accumulator commutators to punch magnets PM1, PM2 and PM3 and then through contacts R20*d*, now operated, of relay R20. The punch magnets are then operated to cause punching of the card passing the punching station according to the digits registered in the tabulator accumulators. The coils of the comparing relays are disconnected from the supply line 2 by the operation of contacts R12*d*. Contacts R12*e* divert the clutch magnet circuit from the sensing feed clutch to the punching feed clutch and the magnet PCM operates over a circuit from line 1, contacts RCR2, contacts R1*d*, switch contacts SP1, contacts R13*d*, contacts R12*e* (now operated), magnet PCM, to line 2. A new summary card is thus produced during this reproducer cycle.

During the third reproducer cycle punching operations are prevented by the de-energisation of the relay R20 as relay R12 releases. The punch feed clutch PCM is maintained by the operation of contacts R13*d* of relay R13 in a circuit similar to that controlled by contacts R12*a* during the second reproducer cycle. The contacts R13*c* disconnect the comparing relay coils R21, R22, R23 from the supply line 2. The third reproducer cycle allows the new summary card to pass into a card stacker.

It is a feature of this type of punching machine that a card which has been passed by the auxiliary feeding mechanism through the sensing station is deposited in a second card stacker. The machine operator removes cards from both stackers for examination.

The machines are restarted, if necessary, by the operation of the reset key RS which breaks the holding circuit for relays R68, R69 and R34, allowing the reproducer circuits to restore. The tabulator resetting and automatic starting circuits become effective in the normal way.

Alternatively, a relay may be energised towards the end of the third cycle under control of the relay R13. The contacts of this relay are connected in parallel with the contacts of the key RS, so that the machines are restarted automatically under both comparison conditions.

It will be appreciated that the tabulator and the reproducer are only interconnected electrically, and that the circuits are so arranged that there is no requirement for mechanical synchronisation between the two machines, or even for them to run at the same speed.

The circuit arrangements described also permit the use of the reproducer for the preparation of summary cards prior to the checking operation described. During a summary card punching operation the tabulator functions as already described, but the operation of the reproducer is modified by the operation of a switch having two sets of contacts designated SP1 and SP2 respectively. Contacts SP1 modify the reproducer feed clutch circuit described so that the reading clutch magnet RCM is disconnected and the circuit is diverted to operate the punch clutch magnet PCM. Thus, the reproducer cycle initiated by the tabulator always results in a card being fed through the punching station. Contacts SP2 of the switch provide a circuit from line 1 to energise the selecting relay R20. Contacts R20*a*, R20*b*, R20*c* and R20*d* disconnect the circuit to the comparing relays and connect the punch magnets PM1, PM2 and PM3 to the accumulators of the tabulator in the manner described. Since the comparing relays are now disconnected an error indication cannot be initiated and the tabulator restarting circuits are brought into operation by the release of relay R68 as described, when the contacts RCR3 break at the end of the reproducer cycle.

I claim:

1. Statistical apparatus comprising a master machine for operation on a first set of records which each carry a value-representing recording and are arranged in successive groups, the records carrying identifying recordings for use in detecting the ends of the groups, said master machine including means for successively feeding and sensing the records of said first set to derive signals representing the values recorded on them, accumulating means registering the sum of value-representing signals fed to it, means feeding said derived signals to the accumulating means, and control means controlling the operation of the master machine and including means responsive to detection of the feeding of the last card of a group for generating a control signal, the statistical apparatus also comprising a slave machine for operation on a second set of records which each carry a value-representing recording and each correspond to a different single group of the first set of records, said second set being assembled in the same order as the groups of the first set, the slave machine including record feeding and sensing means for successively feeding and sensing the records of said second set to derive signals representing the values recorded on them, signal comparison means comparing two value-representing signals and arranged to assume one of first and second states respectively corresponding to the signals fed to it representing the same and different values and control means controlling the operation of the second feeding and sensing means, the statistical apparatus further including electrical connections between the master machine and the slave machine and the slave machine control means further including means responsive to the receipt of the master machine control signal over one of said connections to cause feeding and sensing of a record of the second set and feeding of the derived value-representing signal to the comparison means, a second one of said connections connecting the comparison means and the accumulating means to permit comparison of the value registered in the accumulating means with that represented by the signal fed to the comparison means from the slave machine sensing means, and a third one of said connections connecting the comparison means to the master machine control means, said latter control means responding to the comparison means being in its first state to continue feeding the first set of records and in its second state to prevent further feeding of the first set of records.

2. Statistical apparatus according to claim 1 in which the slave machine further includes recording means for producing a record of value-representing signals fed to it and the slave machine control means further includes recording control means responsive to the comparison means taking up its second state to actuate the recording means to produce a record of the value registered in the accumulating means.

3. Statistical apparatus according to claim 2 in which the slave machine control means has a second mode of operation, in which it is responsive to the master machine control signal to cause only actuation of the recording means to produce a record of the value registered in the accumulating means, and means for setting the slave machine control means to said second mode of operation.

4. Apparatus as claimed in claim 1 in which the master machine control means is cyclic in operation, controls said feeding means to feed each of a group of records past said sensing means during each of a succession of cycles, and includes means operable in response to sensing of said identifying records for disabling the record feeding means at the end of a group.

5. Apparatus as claimed in claim 4 in which the control means selects at least one cycle of operation after the sensing of the last record of a group, the accumulating means being reset during a predetermined one of these cycles and the control signal being generated in response to the selection of the cycle immediately preceding the said predetermined cycle.

6. Apparatus as claimed in claim 4 in which the slave machine is cyclic in operation and the feeding means is arranged to feed a record past the said second sensing means during each cycle, one record being fed during each operation of the comparing means.

7. Apparatus as claimed in claim 6 in which the comparing means is synchronous with the cycles of operation of the slave machine and includes means for deriving test signals which are applied to the accumulating means in synchronism with the passage of the said record past the slave machine sensing means.

8. Apparatus as claimed in claim 7 for operation with sets of records on which the recordings are in digital form in which apparatus the accumulating means registers values in digital form the comparing means includes a comparing element for each digit of the values to be compared, each element having a first and a second state being set to the first state if a digit sensed from a record by the slave machine sensing means does not agree with the corresponding digit of a value registered in the accumulating means, and remaining set to the second state if the digits agree.

9. Apparatus as claimed in claim 8 in which the master machine control means controls the master machine card feeding means to feed a new group of records if none of the comparing elements have been set to the said first state during the passage of a record through the slave machine sensing means.

10. Apparatus as claimed in claim 8 in which each element of the comparing means is an electromagnetic relay device.

11. Apparatus as claimed in claim 8 in which each element provides an indication if it is set to the first state during the passage of a record through the slave machine sensing means, and having means operable in response to the said indication to record the values registered in the accumulating means.

12. Apparatus as claimed in claim 11 in which the recording means is a device having means for feeding record cards in succession past a punching means, one card being fed for each operation of the feeding means, data items being recorded on the card by the operation of the punching means in response to signals applied to the accumulating means in synchronism with the passage of the record past the punching means.

13. Apparatus as claimed in claim 11 having means for disabling the master machine card feeding means if any element provides an indication that it has been set to the first state.

References Cited in the file of this patent

UNITED STATES PATENTS 2,110,853 Daly ---------------- Mar. 15, 1938